US008878866B2

(12) United States Patent
Noda

(10) Patent No.: US 8,878,866 B2
(45) Date of Patent: Nov. 4, 2014

(54) DISPLAY CONTROL DEVICE, DISPLAY CONTROL METHOD, AND PROGRAM

(75) Inventor: Takuro Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 329 days.

(21) Appl. No.: 13/368,454

(22) Filed: Feb. 8, 2012

(65) Prior Publication Data

US 2012/0249582 A1 Oct. 4, 2012

(30) Foreign Application Priority Data

Mar. 31, 2011 (JP) ................................. 2011-078823

(51) Int. Cl.

| | |
|---|---|
| ***G09G 5/00*** | (2006.01) |
| ***G09G 5/02*** | (2006.01) |
| ***H04N 5/445*** | (2011.01) |
| ***H04N 9/74*** | (2006.01) |
| ***G06F 3/00*** | (2006.01) |
| ***G06F 3/048*** | (2013.01) |
| ***G09G 5/14*** | (2006.01) |
| *G09G 3/00* | (2006.01) |

(52) U.S. Cl.

CPC .............. *G09G 5/14* (2013.01); *G09G 2354/00* (2013.01); *G09G 2340/10* (2013.01); *G09G 3/003* (2013.01)

USPC ........... 345/592; 345/619; 345/629; 348/563; 348/588; 715/700; 715/764; 715/781; 715/790

(58) Field of Classification Search

USPC ......... 345/581, 619, 629–630, 623–626, 592; 348/552, 553, 563–565, 569, 596, 588, 348/584; 715/273, 700, 763–764, 765, 781, 715/783, 788, 790, 798–799

See application file for complete search history.

(56) References Cited

U.S. PATENT DOCUMENTS

| | | | | |
|---|---|---|---|---|
| 2009/0096810 A1* | 4/2009 | Green | ........................... | 345/620 |
| 2010/0045570 A1* | 2/2010 | Takata | .............................. | 345/4 |

FOREIGN PATENT DOCUMENTS

| | | |
|---|---|---|
| JP | 2000-155635 | 6/2000 |

OTHER PUBLICATIONS

U.S. Appl. No. 13/364,466, filed Feb. 2, 2012, Noda.

* cited by examiner

*Primary Examiner* — Wesner Sajous

(74) *Attorney, Agent, or Firm* — Oblon, Spivak, McClelland, Maier & Neustadt, L.L.P.

(57) ABSTRACT

A display control device includes: a changing unit changing a two-dimensional location representing locations in a horizontal direction and an orthogonal direction of each of a plurality of objects having different depths for a display screen of a display unit according to a direction in which a user views the display unit; a transparency adjusting unit for adjusting transparency for each of the plurality of objects; and a display control unit for displaying the plurality of objects in which the two-dimensional location is changed and the transparency is adjusted on the display unit, so as to overlap each other.

5 Claims, 9 Drawing Sheets

DISPLAY CONTROL DEVICE, DISPLAY CONTROL METHOD, AND PROGRAM

BACKGROUND

The present disclosure relates to a display control device, a display control method, and a program, and particularly relates to a display control device, a display control method, and a program in which it is possible to easily recognize objects such as windows displayed on a rear surface when displaying the objects overlapping each other on a screen.

For example, in a personal computer, a plurality of windows may be displayed on a display (Japanese Unexamined Patent Application Publication No. 2000-155635).

In the personal computer, for example, by displaying a plurality of windows overlapping each other according to a user operation, a region for displaying other windows may be secured on the display.

SUMMARY

However, when displaying a plurality of windows overlapping each other in the foregoing personal computer, it is difficult to see windows displayed on a rear surface through windows displayed on a front surface.

It is desirable that it be possible to easily recognize objects such as windows displayed on a rear surface when displaying the objects overlapping each other on a screen.

According to an embodiment of the present disclosure, there is provided a display control device including: a changing unit for changing the two-dimensional location representing locations in the horizontal direction and the orthogonal direction for each of a plurality of objects having different depths for a display screen of a display unit according to the direction in which a user views the display unit; a transparency adjusting unit for adjusting the transparency of each of the plurality of objects; and a display control unit for displaying the plurality of objects in which the two-dimensional location is changed and the transparency is adjusted overlapping each other in the display unit.

A detecting unit for detecting an object of the plurality of objects to which the user focuses may be further provided, and the transparency adjusting unit may adjust the transparency of the object to which the user attends to be lower than that of an object to which the user does not focus.

The transparency adjusting unit may adjust respective transparencies of the plurality of objects to have different values.

According to another embodiment of the present disclosure, there is provided a display control method of a display control device for displaying an object on a display unit, the method by the display control device including: changing a two-dimensional location representing locations in the horizontal direction and the orthogonal direction of each of a plurality of objects having different depths for a display screen of a display unit according to the direction in which a user views the display unit; adjusting the transparency of each of the plurality of objects; and displaying the plurality of objects in which the two-dimensional location is changed and the transparency is adjusted overlapping each other in the display unit.

According to still another embodiment of the present disclosure, there is provided a program allowing a computer to function as a changing unit for changing a two-dimensional location representing locations in the horizontal direction and the orthogonal direction for each of a plurality of objects having different depths for a display screen of a display unit according to the direction in which a user views the display unit; a transparency adjusting unit for adjusting the transparency for each of the plurality of objects; and a display control unit for displaying the plurality of objects in which the two-dimensional location is changed and the transparency is adjusted overlapping each other in the display unit.

According to another embodiment of the present disclosure, the two-dimensional location representing locations in the horizontal direction and the orthogonal direction for each of a plurality of objects having different depths for a display screen of a display unit are changed according to the direction in which a user views the display unit; the transparency of each of the plurality of objects is adjusted; and the plurality of objects in which the two-dimensional location is changed and the transparency is adjusted are displayed overlapping each other in the display unit.

According to the embodiments of the present disclosure, it is possible to easily recognize objects such as windows displayed on a rear surface when displaying the objects overlapping each other.

DETAILED DESCRIPTION OF EMBODIMENTS

The embodiments of the present disclosure (hereinafter, referred to as the embodiments) will be described below. Here, description will be given in the following order.

1. First Embodiment (example in a case where it is possible to see an object of a rear surface so that transparency of the object is adjusted)

2. Second Embodiment (example in a case where a location of an object is changed according to the direction in which a user sees while adjusting the transparency of the object)

3. Modified example.

1. First Embodiment

Configuration Example of Personal Computer 1

Figure 1:
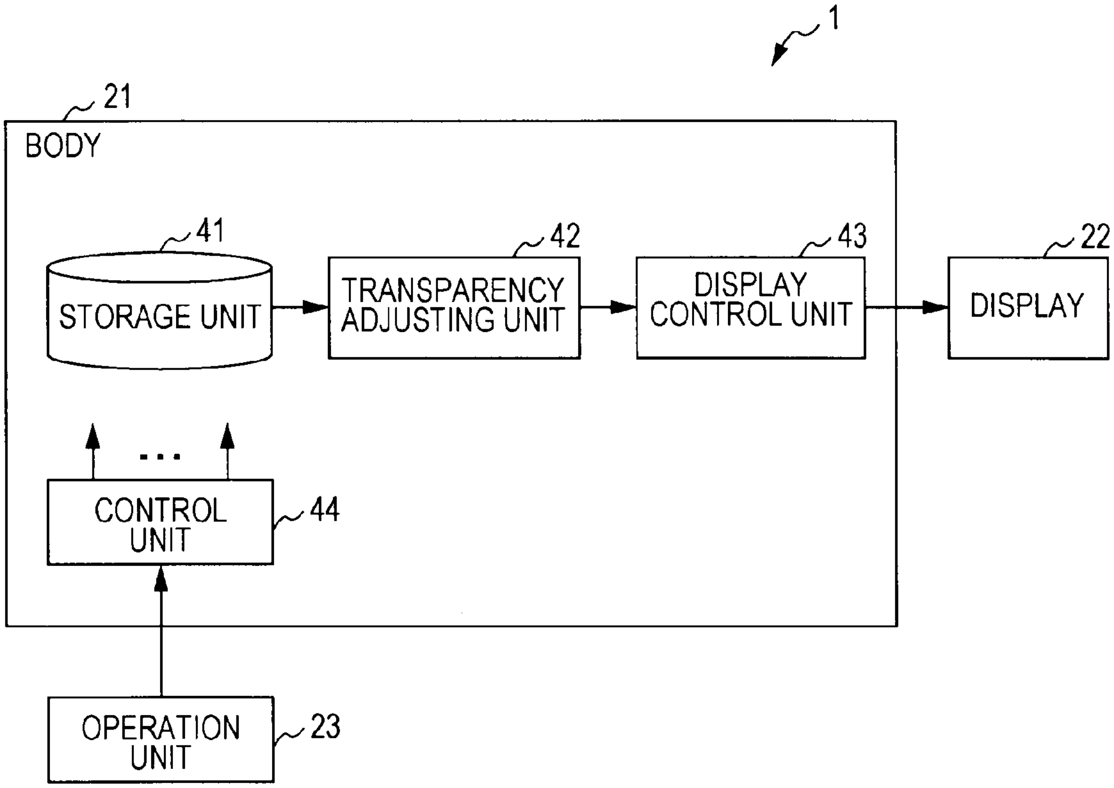
FIG. 1 is a block diagram illustrating a configuration example of a personal computer according to an embodiment of the present disclosure.

FIG. 1 illustrates a configuration example of a personal computer 1 according to the first embodiment of the present disclosure.

The personal computer 1 is configured by a body 21, a display 22, and an operation unit 23.

Here, the personal computer 1 adjusts transparencies of objects such as windows and the like displayed on the display 22, so that it is also possible to easily recognize an object of a rear surface even in a state where the objects overlap. Here, any object which can be displayed on the display 22 may display other contents except for windows, for example, documents, photographs, and moving images as the object and the like.

The body 21 adjusts transparency of each of a plurality of objects displayed on the display 22 according to an operation signal from an operation unit 23. Further, the body 21 is displayed on the display 22 by overlapping a plurality of objects in which the transparency is adjusted.

The display 22 displays a plurality of objects supplied from the body 21 overlapping each other.

The operation unit 23 is configured by operation buttons and is operated by a user. The operation unit 23 supplies a corresponding operation signal to the body 21 according to the user operation.

The body 21 is configured by a storage unit 41, a transparency adjusting unit 42, a display control unit 43, and a control unit 44.

For example, the storage unit 41 stores (maintains) a plurality of objects displayed on the display 22 in advance.

The transparency adjusting unit 42 reads out a plurality of objects from the storage unit 41. Further, the transparency adjusting unit 42 adjusts transparency of each of a plurality of read objects, for example, using a blending or the like, and supplies the plurality of objects in which the transparency is adjusted to a display control unit 43.

Here, the transparency adjusting unit 42, for example, equally adjusts transparencies of a plurality of objects, respectively. That is, for example, the transparency adjusting unit 42 adjusts respective transparencies of a plurality of objects to be translucent. In addition, for example, the transparency adjusting unit 42 may adjust the transparencies of a plurality of objects to be different values, respectively.

The display control unit 43 supplies a plurality of objects from the transparency adjusting unit 42 to the display 22, so that they are displayed overlapping each other.

The control unit 44 controls the transparency adjusting unit 42 and the display control unit 43 according to the operation signal from the operation unit 23.

That is, for example, when a user operates the operation unit 23 to focus a predetermined object of the plurality of displayed objects overlapping each other, the control unit 44 detects the predetermined attended object according to the operation signal from the operation unit 23, so that the transparency adjusting unit 42 performs a following process.

Concretely, for example, the transparency adjusting unit 42 compares the transparency of, for example, a predetermined object attended by the user of a plurality of objects with that of another object to adjust the transparency of the predetermined object to be low under control of the control unit 44.

Furthermore, for example, when the user operates the operation unit 23 to set an attention degree by which the user attends to each of a plurality of objects, the control unit 44 detects the attention degree of each of the objects according to an operation signal from the operation unit 23, so that the transparency adjusting unit 42 performs a following process.

Specifically, for example, the transparency adjusting unit 42 adjusts transparency of each of the plurality of objects according to an attention degree of the user (e.g., transparency becomes higher by reduction of the attention degree) under the control of the control unit 44.

Here, by detecting the eyes of the user with respect to a display screen of the object 22 in the personal computer 1, it may be configured so that the user detects an attended object based on the detected eyes. This is similar to a personal computer 81 to be described later.

Figure 2:
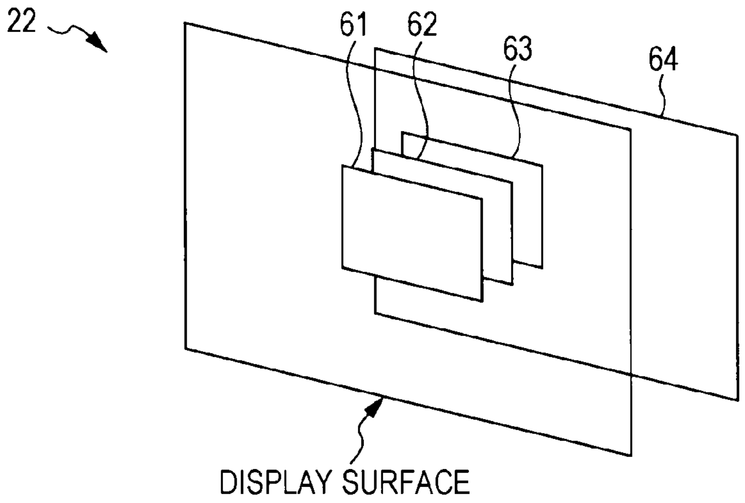
FIG. 2 is a diagram illustrating an example when displaying a plurality of objects overlapping each other on a display.

Next, FIG. 2 is a diagram illustrating an example when displaying a plurality of objects overlapping each other on a display 22.

For example, as shown in FIG. 2, the display 22 displays a plurality of overlapped objects 61 to 63 on the front surface of a background 64, respectively.

The plurality of objects 61 to 63 are three-dimensional images, respectively, and have different depths with respect to a display screen (display surface) of the display 22.

In addition, for example, when the user operates the operation unit 23 to select an object 63 among a plurality of objects 61 to 63, the operation unit 23 supplies a corresponding operation signal to the control unit 44. The control unit 44 controls the transparency adjusting unit 42 and the display control unit 43 according to the operation signal from the operation unit 23.

That is, the transparency adjusting unit 42 reads out a plurality of objects 61 to 63 from the storage unit 41. Further, the transparency adjusting unit 42 compares transparencies of the read objects 61 to 63 with each other, adjusts the transparency of the read object 63 to be low, and supplies the plurality of objects 61 to 63 in which the transparency of each is adjusted to the display control unit 43.

The control unit 43 supplies objects 61 to 63 from the transparency adjusting unit 42 to the display 22 such that the display 22 displays the objects 61 through 63 overlapping each other. Thereby, because the object 63 is displayed in a low transparency state (deep state) and other objects 61 and 62 are displayed in a high transparency state (pale state), the user may easily recognize a selected (focused) object 63.

[Operation Description of Personal Computer 1]

Figure 3:
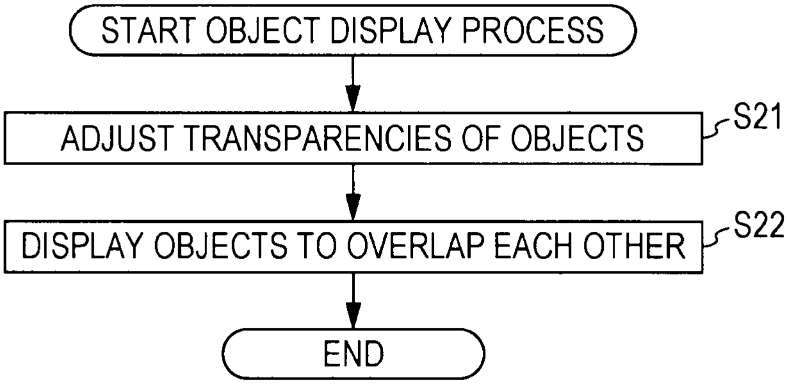
FIG. 3 is a flowchart for describing an object displaying process performed by the personal computer of FIG. 1.

Subsequently, referring to a flowchart of FIG. 3, an object display process performed by the personal computer 1 will be described.

For example, the object display process starts when an operation unit 23 is operated such that a plurality of objects 61 to 63 are displayed overlapping each other on the display 22. At this time, the controller 44 controls the transparency adjusting unit 42 and the display control unit 43 according to an operation signal from the operation unit 23.

That is, in step S21, a transparency adjusting unit 42 reads out a plurality of objects 61 to 63 from a storage unit 41. Further, for example, the transparency adjusting unit 42 adjusts transparencies of a plurality of read objects 61 to 63 using a blending and the like, and supplies a plurality of objects 61 to 63 in which the transparency is adjusted to a display control unit 43.

In step S22, the display control unit 43 provides the objects 61 to 63 from the transparency adjusting unit 42 to the display 22, so that the objects 61 to 63 are displayed overlapping each other. The foregoing object display process is ended.

As described above, according to the object display process, transparencies of objects 61 to 63 having different depths from a display screen of the display 22 are adjusted, and objects 61 to 63 after adjustment are displayed overlapping each other. Thereby, in step S22, it is possible to efficiently use a display region for displaying an image.

Further, because objects 61 to 63 having different depths in which the transparency adjusted, are displayed, even in the case where the objects 61 to 63 are displayed overlapping each other, it is possible to easily recognize any of the objects 61 to 63.

Figure 4:
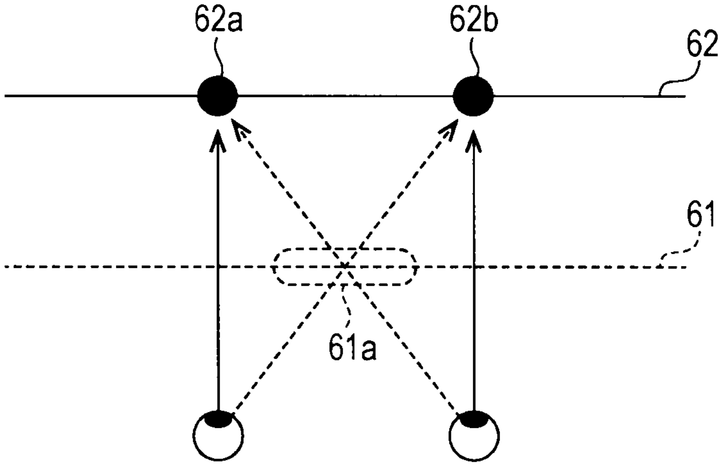
FIG. 4 is a diagram illustrating an example when an object on a rear surface is seen.

Next, FIG. 4 illustrates that it is possible to easily recognize display regions 62*a* and 62*b* on, for example, an object 62 of a plurality of objects 61 to 63.

Here, as shown in FIG. 4, in a display region 61*a* on the object 61, for example, too many characters and the like are described, and transparencies thereof become comparatively low.

In this case, even though it is difficult to recognize display regions 62*a* and 62*b* on the object 62 through a display region 61*a* on the object 61, the user can easily recognize the display regions 62*a* and 62*b* other than the display region 61*a* through a display region on an object 61.

This causes a plurality of objects 61 to 63 to be displayed as three-dimensional images having different depths, respectively. Here, in the display 22, it is possible to display a plurality of objects 61 to 63 having the same depth overlapping each other. However, in this case, it is desirable to display at least one of respective objects 61 to 63 to be slightly moved.

Thereby, even if displaying a plurality of objects 61 to 63 having the same depth, it is possible to more easily recognize an object of a rear surface by slight movement thereof.

Here, when moving a plurality of objects 61 to 63 by different pattern, respectively, it is possible to easily identify the objects 61 to 63, respectively.

2. Second Embodiment

Configuration Example of Personal Computer 81

Figure 5:
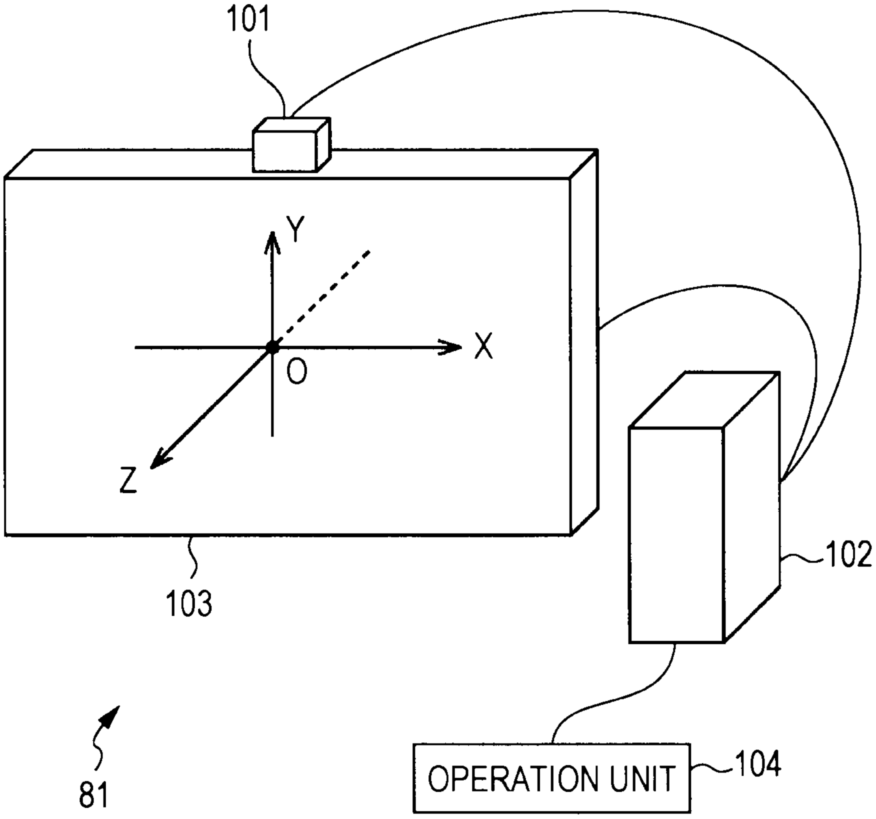
FIG. 5 is a diagram that illustrates a configuration example of a personal computer according to a second embodiment of the present disclosure.

Next, FIG. 5 illustrates a configuration example of a personal computer 81 according to a second embodiment of the present disclosure.

The personal computer 81 is configured by a camera 101, a body 102, a display 103, and an operation unit 104.

The camera 101 images a user visibly recognizing objects 61 to 63 on a display 103 in front of the display 103, and supplies a captured image obtained by the imaging operation to the body 102.

The body 102 detects a location of the user (e.g., locations of the face of the user, etc.) displayed on the captured image based on the captured image from the camera 101.

Further, the body 102 performs shear deformations for a plurality of objects 61 to 63 according to the detected location of the user.

Further, the body 102 adjusts transparencies of objects 61 to 63 after shear deformation, supplies the objects 61 to 63 in which the transparency is adjusted to the display 103, and displays the objects 61 to 63 overlapping each other.

Here, the second embodiment has illustrated performing shear deformation for example, when deforming the objects 61 to 63. However, a deforming method when deforming the objects 61 to 63 is not limited thereto.

The display 103 displays a plurality of objects 61 to 63 supplied from the body 102 overlapping each other. Here, the second embodiment defines an XYZ coordinate space as illustrated in FIG. 5 for simplifying the description. For example, the XYZ coordinate space is defined by the X axis, the Y axis, and the Z axis indicating the horizontal direction, the vertical direction, and the front direction (depth direction) of the display 103 by using a center (center of gravity) of the display screen in the display unit 103 as an origin O.

Here, an optical axis of the camera 101 matches the Z axis in the X axis direction, and is deviated from the Z axis upward by a predetermined distance $D_y$ in the Y axis direction.

[Configuration Example of Body 102]

Figure 6:
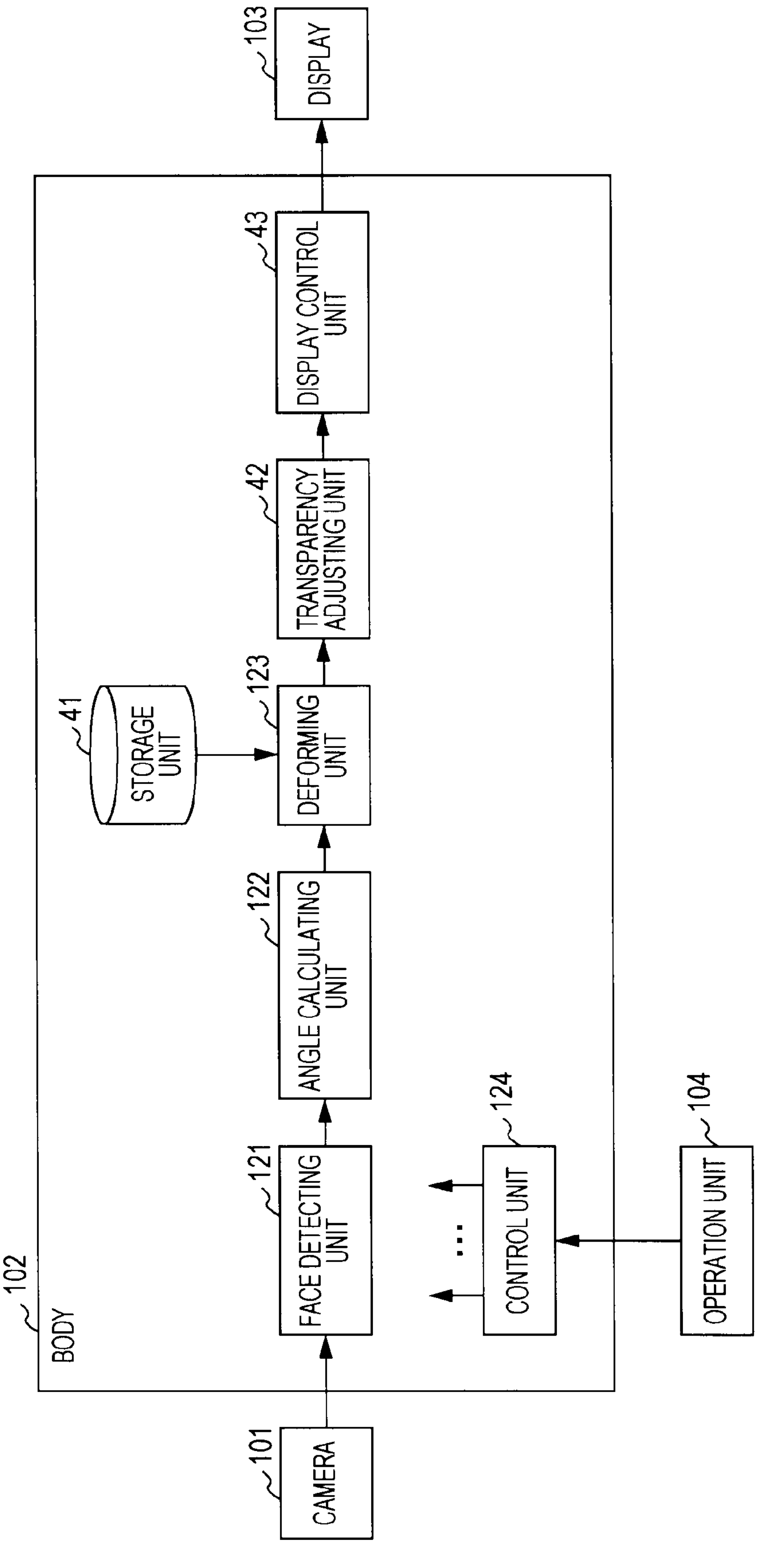
FIG. 6 is a block diagram illustrating a configuration example of a body in FIG. 5.

FIG. 6 illustrates a configuration example of a body 102.

Here, in the body 102 of FIG. 6, the same symbols are given for portions that are configured similar to the body 21 in FIG. 1, and the description thereof will be omitted as appropriate.

That is, the body 102 is configured similarly to the case of FIG. 1 except that a face detecting unit 121, an angle calculating unit 122, and a changer 123 are newly provided and a control unit 124 is provided instead of the control unit 44.

A captured image from the camera 101 is supplied to the face detector 121. The face detecting unit 121 detects the face of a user displayed on the captured image based on the captured image from the camera 101. Specifically, for example, the face detecting unit 121 detects a region of a peach color part of all regions on the captured image as a face region representing the face of the user.

Further, the face detecting unit 121 detects a face position (Ax, Ay) indicating the location of the face of the user on the captured image based on the detected face region, and supplies the detected face region to the angle calculating unit 122. Here, for example, the face position (Ax, Ay) becomes a center of gravity in the face region. Further, the face position (Ax, Ay) is defined by the X axis and the Y axis perpendicular to an origin (0, 0), for example, by using a center on a captured image as the origin (0, 0).

Here, the X axis and the Y axis defined on the captured image are used as the X' axis and the Y' axis so as to discriminate the X axis and the Y axis illustrated in FIG. 5.

The angle calculating unit 122 calculates an angle θ indicating a deviation between a face position (x, y) expressing a location of the face of the user in an XYZ coordinate space and a predetermined Z axis (FIG. 5) based on a face position (Ax, Ay) from the face detecting 121, and supplies the calculated angle θ to the deforming unit 123.

That is, for example, the angle calculating unit 122 calculates an angle $\theta_x$ indicating a deviation between a face position (x,y) and the Z axis in the X axis direction and an angle $\theta_y$ indicating the face position (x,y) and the Z axis in the Y axis direction as an angle θ, and supplies the angles $\theta_x$ and $\theta_y$ to the deforming unit 123. Here, a process performed by the face detecting unit 121 and the angle calculating unit 122 will be described with reference to FIG. 7.

The deforming unit 123 reads out a plurality of objects 61 to 63 from the storage unit 41. Further, the deforming unit 123 performs shear deformations for a plurality of objects 61 to 63 read out from the storage unit 41 based on the angle $\theta_x$ and the angle $\theta_y$ from the angle calculating unit 122, and supplies the objects 61 to 63 after the shear deformations to the transparency adjusting unit 42. Here, a process performed by the deforming unit 123 will be described with reference to FIG. 8.

For example, the control unit 124 performs the same process as that of the control unit 44 in FIG. 1 according to an operation signal from the operation unit 104. Further, the control unit 124 controls a camera 101, a face detecting unit 121, an angle calculating unit 122, and a deforming unit 123, for example, according to an operation signal from the operation unit 104.

[Details of Face Detecting Unit 121 and Angle Calculating Unit 122]

Next, referring to FIG. 7, details of a process performed by the face detecting unit 121 and the angle calculating unit 122 will be described.

Figure 7:
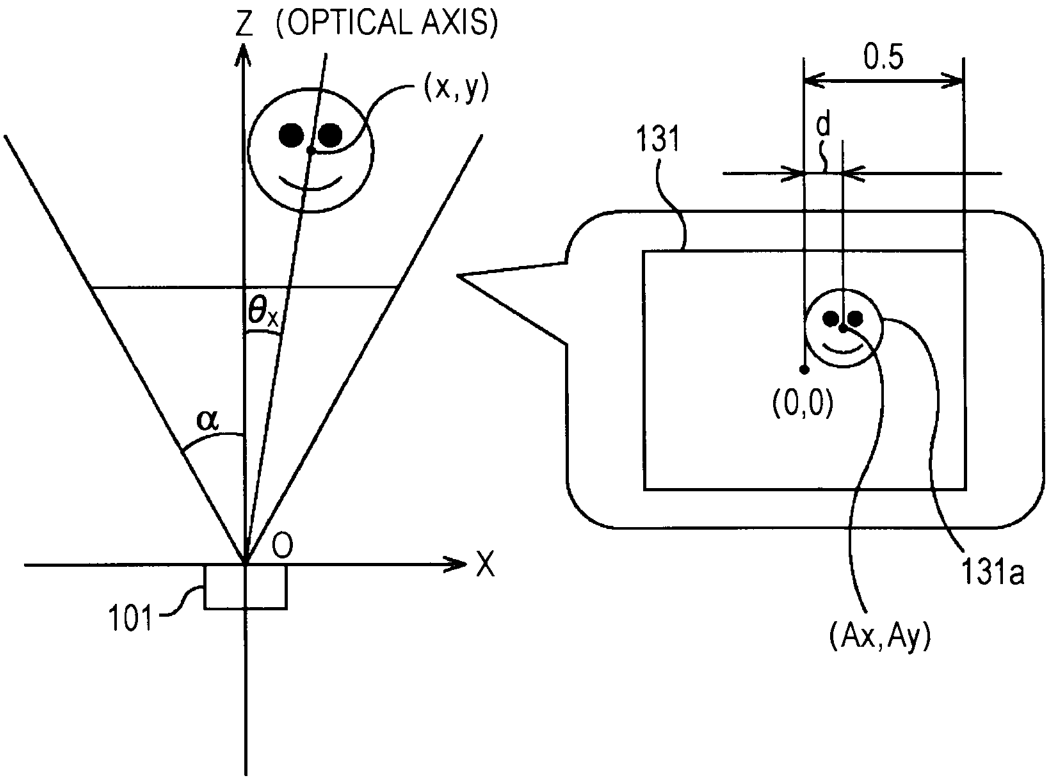
FIG. 7 is a diagram for describing details of a process performed by a face detector and an angle calculator.

The face detecting unit 121 detects a face region 131*a* from a captured image 131 as illustrated in a right side of FIG. 7 supplied from the camera 101. Further, for example, the face detecting unit 121 detects a center of gravity of the face region 131*a* as a face position (Ax, Ay) on the captured image 131, and supplies the detected center of gravity of the face region 131*a* to the angle calculating unit 122. Here, for example, the face position (Ax, Ay) is defined by the X' axis and Y' axis perpendicular to an origin (0, 0) by using a center on the captured image as the origin (0, 0).

The angle calculating unit 122 normalizes (divides) Ax of the face region (Ax, Ay) from the face detecting unit 121 with a horizontal width of the captured image 131 as illustrated in a right side of FIG. 7 and converts the normalized Ax into a value d. Here, a location Ax on the X' axis representing a right end part of the captured image 131 is normalized with a horizontal width of the captured image 131 and the normalized location Ax is changed to 0.5.

Further, the angle calculating unit 122 calculates an angle $\theta_x$ by an equation (1) based on a value d obtained by normalization and a half image angle $\alpha$ of a horizontal direction (X axis direction) in a camera 101 as illustrated in a left side of FIG. 7, and supplies the calculated half image angle $\theta_x$ to the deforming unit 123. Here, the angle calculating unit 122 maintains in advance an angle $\alpha$ in a memory (not shown) embedded therein.

$$\theta_x=\arctan\{d/(0.5/\tan\alpha)\} \quad (1)$$

Here, the angle $\theta_x$ represents a deviation between a face position (x,y) and an optical axis of (imaging direction) of the camera 101.

Here, an optical axis of a camera 101 matches the Z axis in the X axis direction. Accordingly, the angle $\theta_x$ may present a deviation between a face position (x,y) and the Z axis in the X direction.

However, the equation (1) is obtained as follows. That is, on the Z axis, if it is assumed that a value changed according to a position z of a user face is f(z), following equations (2) and (3) are derived.

$$\tan \theta hd\ x=d/f(z) \quad (2)$$

$$\tan\alpha=0.5/f(z) \quad (3)$$

A f(z)=0.5/tan $\alpha$ is calculated by the equation (3). If it is substituted for the equation (2), a following equation (4) is derived.

$$\tan\theta_x=d/(0.5/\tan\alpha) \quad (4)$$

Further, in the equation (4), when an inverse function of tan $\theta_x$ is obtained, the foregoing equation (1) is derived.

Further, for example, the angle calculating unit 122 normalizes (divides) Ay of a face position (Ax, Ay) from the face detecting unit 121 with a vertical width of the captured image 131, and adds an offset value corresponding to a distance $D_y$ to the resultant value d". Further, the angle calculating unit 122 calculates an angle $\theta_y$ by a following equation (5) based on a value d' obtained by the addition and a half image angle $\beta$ of the vertical direction (Y axis direction) of the camera 101, and supplies the calculated angle $\theta_y$ to the deforming unit 123.

$$\theta_y=\arctan\{d'/(0.5/\tan\beta)\} \quad (5)$$

Here, calculation of a value d' by adding an offset value corresponding to a distance $D_y$ to a value d" is achieved by deviating an optical axis of the camera 101 from the Z axis by a distance $D_y$ in the Y axis direction. That is, when the angle calculating unit 122 calculates an angle $\theta_y$ in a manner similar to a case where the angle $\theta_x$ is calculated, the angle $\theta_y$ does not represent a deviation between a face position (x,y) and the Z axis in an Y direction.

Accordingly, the angle calculating unit 122 calculates a value d' by adding an offset value to the value d" in consideration of a deviation between an optical axis and the Z axis of the camera 101 in the Y axis direction, thereby calculating the angle $\theta_y$ by the equation (5). Further, in the captured image 131, a distance between a location (0,y) (y<0) corresponding to a three-dimensional position (0,0,z) in an XYZ coordinate space and an origin (0, 0) is a distance corresponding to a distance $D_y$, and the offset value becomes a value obtained by normalizing a distance between a location (0,y) and an origin (0, 0) with a vertical width of the captured image 131 in the captured image 131.

[Details of Deforming Unit 123]

Hereinafter, details of a process performed by the deforming unit 123 will be given with reference to FIG. 8.

The deforming unit 123 reads out a plurality of objects 61 to 63 stored in the storage unit 41 and deforms the read objects 61 to 63 based on angles $\theta_x$ and $\theta_y$ from the angle calculating unit 122. Further, in FIG. 8, so as to prevent the drawing from being complicated, only the object 61 is illustrated.

Figure 8:
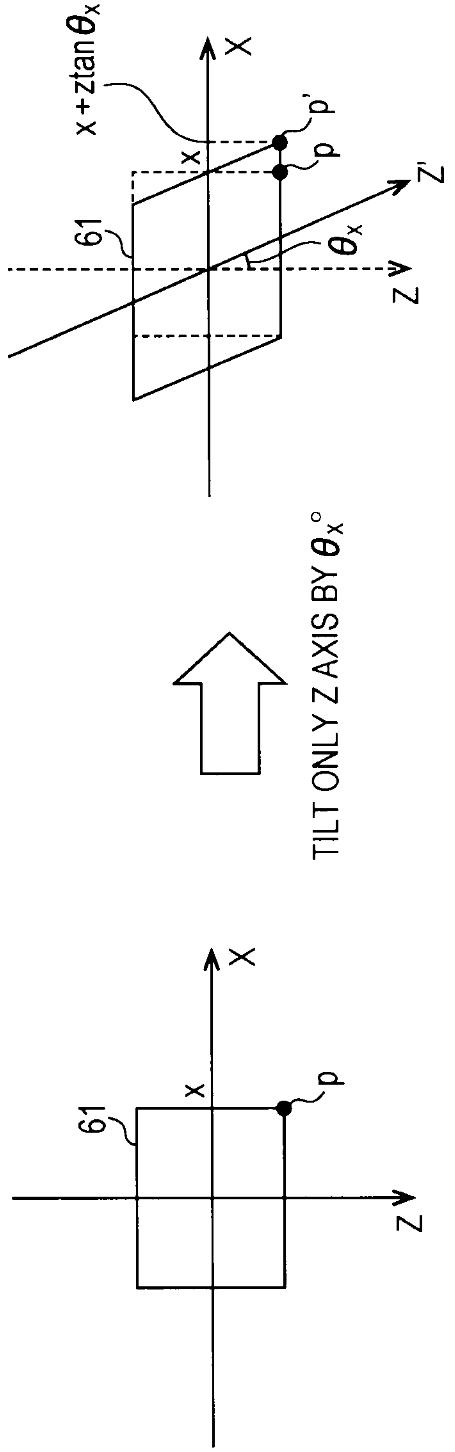
FIG. 8 is a diagram for describing details of a process performed by a deforming unit.

That is, for example, the deforming unit 123, as illustrated in FIG. 8, in the Z axis defining each position z of the objects 61 to 63, axis inclines the Z by an angle $\theta_x$ from the angle calculating unit 122 compared with the axis. Thereby, for example, the x in a three-dimensional position p(x, y, z) of the object 61 becomes x+z tan $\theta_x$.

Further, for example, in the same manner, the deforming unit 123 inclines the Z axis by an angle $\theta_y$ from the angle calculating unit 122 compared with the Y axis. Thereby, a y in a three-dimensional position p(x, y, z) of the object 61 becomes y+z tan $\theta_y$.

By doing this, the deforming unit 123 performs an affine deformation for a three-dimensional position p(x,y,z) of the object 61 to a three-dimensional position p'(x+z tan $\theta_x$, y+z tan $\theta_y$,z) of the object 61 to perform a shear deformation for a shape of the object 61.

Here, actually, the deforming unit 123 performs the affine deformation for a 2D image for a left eye and a 2D image for a right eye constituting an object 61 as a three-dimensional image, respectively, and performs a shear deformation for a shape of the object 61. Here, parallax is provided between the 2D image for a left eye and the 2D image for a right eye such that an object 61 recognized visibly by the user is three-dimensionally viewed.

Further, in the same manner, the deforming unit 123 performs shear deformations for the objects 62 and 63, respectively.

The deforming unit 123 supplies the objects 61 to 63 after shear deformation to the transparency adjusting unit 42.

[Operation Description of Personal Computer 81]

Figure 9:
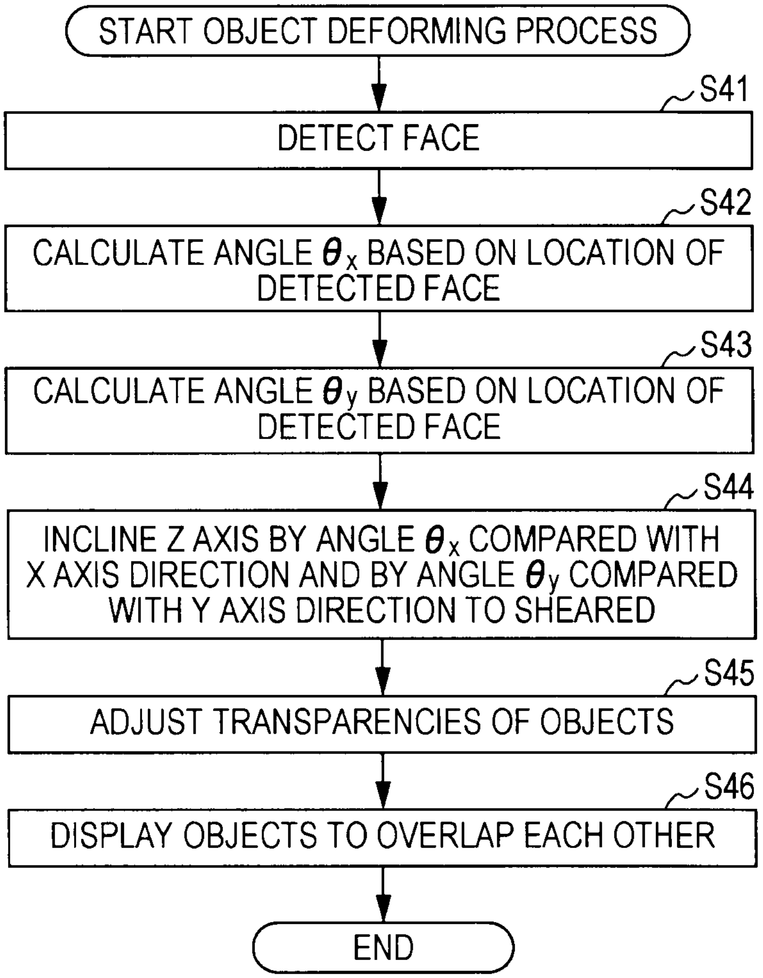
FIG. 9 is a flowchart for illustrating a deforming process of an object performed by a personal computer of FIG. 5.

Next, referring to a flowchart of FIG. 9, an object deforming process performed by a personal computer 81 will be described.

Here, for example, by displaying a plurality of objects 61 to 63 overlapping each other on the display 103, the object deforming process starts when the operation unit 104 is operated. At this time, the control unit 124 controls a face detecting unit 121, an angle calculating unit 122, a deforming unit 123, a transparency adjusting unit 42, a display control unit 43, and a camera 101 according to an operation signal from the operation unit 104. The camera 101 performs an imaging operation under the control of the control unit 124, and supplies the captured image 131 obtained by the imaging operation to the face detecting unit 121.

In step S41, the face detecting unit 121 detects a face of the user displayed on the captured image 131 based on an captured image 131 from the camera 101. Specifically, for example, the face detecting unit 121 detects a region of a peach color part of entire regions on the captured image 131 as a face region 131*a* indicating a face of the user.

Further, the face detecting unit 121 detects a face position (Ax, Ay) on the captured image 131 based on the detected face region 131*a*, and supplies the detected face region to the angle calculating unit 122.

In step S42, the angle calculating unit 122 normalizes Ax of a face position (Ax, Ay) from the face detecting unit 121 with a horizontal width of the captured image 131 and converts the normalized Ax into a value d. Further, the angle calculating unit 122 calculates an angle $\theta_x$ by the equation (1) based on the obtained value d by normalization and a half image angle $\alpha$ of a horizontal direction (X axis direction) in the camera 101, and supplies the calculated angle $\theta_x$ to the deforming unit 123.

In step S43, the angle calculating unit 122 normalizes Ay of a face region (Ax, Ay) from the face detecting unit 121 with a vertical width of the captured image 131 and converts the normalized Ay to a value d''. Further, the angle calculating unit 122 calculates and supplies an angle $\theta_y$ by the equation (5) to the deforming unit 123 based on a value d obtained by adding an offset value to the value d'' obtained by normalization and a half image angle $\beta$ of the vertical direction (Y axis direction) in the camera 101.

In step S44, the deforming unit 123 reads out a plurality of objects 61 to 63 stored in the storage unit 41 from the storage unit 41. Further, the deforming unit 123 performs and supplies shear deformation for the plurality of read objects 61 to 63 to the transparency adjusting unit 42 based on angles $\theta_x$ and $\theta_y$ from the angle calculating unit 122.

That is, for example, the deforming unit 123 inclines the Z axis in an XYZ coordinate space defining a three-dimensional position of a plurality of objects 61 to 63 by an angle $\theta_x$ from the angle calculating unit 122 compared with the X axis. Further, the deforming unit 123 inclines the Z axis by an angle $\theta_y$ from the angle calculating unit 122 compared with the Y axis. Thereby, the XYZ coordinate space is deformed, and a plurality of objects 61 to 63 are also deformed by deformation of the XYZ coordinate space through deformation of the XYZ coordinate space.

In step S45, the transparency adjusting unit 42 adjusts transparencies of a plurality of objects 61 to 63 from the deforming unit 123 and supplies a plurality of objects 61 to 63 in which the transparency is adjusted to the display control unit 43.

In step S46, the display control unit 43 supplies the objects 61 to 63 from the transparency adjusting unit 42 to a display 22 such that they are displayed on the display 22 overlapping each other. The object deforming process is then ended.

As illustrated previously, in the object deforming process, angles $\theta_x$ and $\theta_y$ are calculated as an angle $\theta$ formed between the Z axis being a normal line of a display screen of a display 103 and a direction from which the user views the display screen. Further, by affine conversion for inclining the Z axis in a horizontal direction by an angle $\theta_x$ and in the vertical direction by an angle $\theta_y$, a plurality of objects 61 to 63 are deformed.

To do this, the user may display the objects 61 to 63 to be seen on a real space regardless of a direction recognizing a display surface. Accordingly, the user may confirm, for example, an object 62 to be looked into by the user in the objects 61 to 63 displayed on the display 103.

Further, for example, because the objects 61 to 63 are displayed overlapping each other, it is possible to efficiently use a display region on the display 103 displaying an image.

In addition, for example, in an object deforming process, by changing the Z axis in an XYZ coordinate space, shear deformations for the objects 61 to 63 on the XYZ coordinate space are performed. Accordingly, for example, it is possible to more rapidly perform a process by the deforming unit 123 by comparing a case of separately performing shear deformations for objects 61 to 63 existing in an XYZ coordinate space.

3. Modified Example

As shown in FIG. 8, a second embodiment inclines the Z axis to convert coordinates of objects 61 to 63. However, otherwise, for example, without inclining the Z axis, it is possible to convert coordinates of objects 61 to 63.

Figure 10:
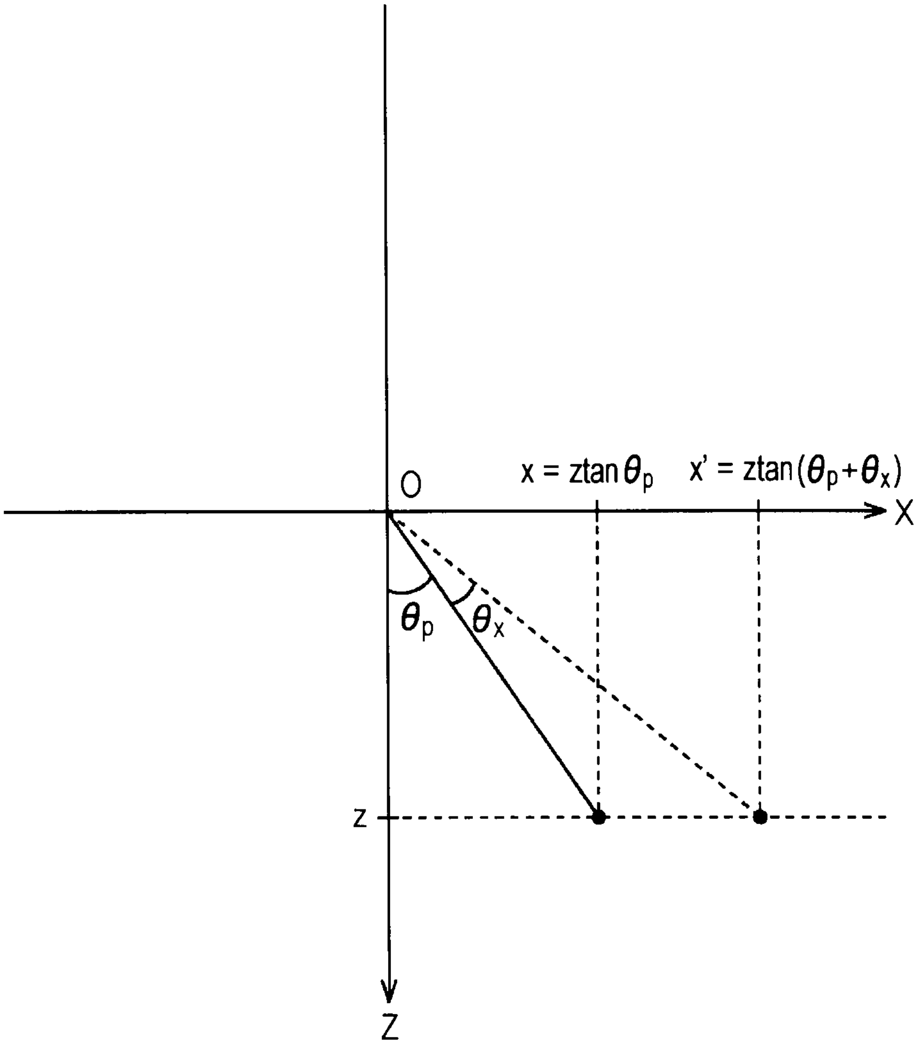
FIG. 10 is a diagram for describing another example of a detailed process performed by the deforming unit.

That is, for example, the deforming unit 123, as illustrated in FIG. 10, for example, a position x(=z tan $\theta_p$) of a three-dimensional position p(x,y,z) of the object 61 is converted into an x'(=z tan($\theta_p$+$\theta_x$)) based on an angle $\theta_x$ from the angle calculating unit 122. Here, as shown in FIG. 10, an angle $\theta_p$ indicates an angle formed between a line segment combining (x,z) of a three-dimensional position p(x,y,z) with an origin O and the Z axis in the XZ plane defined by the X axis and the Z axis.

Further, for example, the deforming unit 123 converts a location y(=z tan $\theta_q$) of a three-dimensional position p(x,y,z) of the object 61 into a location y'(=z tan($\theta_q$+$\theta_y$)) based on an angle $\theta_y$ from the angle calculating unit 122 in the same manner. Here, the angle $\theta_q$ indicates a line segment combining (y,z) of a three-dimensional position p(x,y,z) with an origin O and the Z axis in the YZ plane defined by the Y axis and the Z axis.

Thereby, the deforming unit 123 may converts a three-dimensional position p(x,y,z) of the object 61 into a three-dimensional position p'(x',y',z) to perform a shear deformation for the object 61. This may be the same as in the objects 62 and 63.

In a second embodiment of the present disclosure, a direction in which the Z axis extends matches the normal line of a display screen of the display 103, but the direction in which the Z axis extends is not limited thereto and may be changed by definition of an XYZ coordinate space.

The second embodiment has illustrated a case where a three-dimensional position p(x,y,z) of each of the objects 61 to 63 is known. However, even in a case where the three-dimensional position p(x,y,z) is not known (e.g., a case of a three-dimensional photograph, etc.), the present technology is applied to calculate the three-dimensional position p(x,y,z).

Further, for example, the deforming unit 123 performs a shear deformation for a three-dimensional image composed of two-dimensional images (2D image for right eye and 2D image for left eye) in two observing points as a target. However, for example, the deforming unit 123 may perform a shear deformation for a three-dimensional image composed of two-dimensional images of three or more observing points as a target.

Although one camera 101 is used in the second embodiment, so as to increase a detectable range of a face region of the user, a plurality of cameras may be used to increase an image angle of the camera 101.

Further, for example, the second embodiment calculates values d and d' from a face region (Ax, Ay) on the captured image 131 obtained from the camera 101 to calculate angles $\theta_x$ and $\theta_y$ by the equations (1) to (5).

However, otherwise, for example, a face region (x,y,z) is detected as a three-dimensional position in an XYZ coordinate space, and angles $\theta_x$ and $\theta_y$ may be calculated based on the detected face region (x,y,z) and half image angles $\alpha$ and $\beta$ of the camera 101. That is, for example, $\tan\theta_x = x/z$ . . . (2') and $\tan\alpha = g(z)/z$ . . . (3') are derived from x and z of the detected face region (x,y,z). Further, if $\tan\theta_x = x/(g(z)/\tan\alpha)$ . . . (4') is derived from the equations (2') and (3'), tan $\theta_x$ in the equation (4'), and an inverse function of tan $\theta_x$ is derived, $\theta_x$=arc tan (x/(g(z)/tan α)) . . . (1') is derived. Accordingly, the angle $\theta_x$ is calculated using the equation (1'). Further, the angle $\theta_y$ is calculated by $\theta_y$=arc tan(y/(g(z)/tan β)) . . . (5') in the same manner.

Here, so as to detect a face region (x, y, z) as a three-dimensional position, a stereo camera detecting a face region (x, y, z) using the parallax of two cameras or an infrared sensor detecting a face region (x, y, z) by irradiating infrared rays and the like to a face of the user and the like are used.

In the first embodiment, although the transparency adjusting unit 42 adjusts the transparencies of all of the objects, it may adjust the transparency of only a part of the objects.

That is, for example, in a personal computer 1, in order to detect the eyes of the user with respect to a display screen of the display 22, the user determines the attended region on a display screen according to the detected eyes. Further, the transparency adjusting unit 42 may adjust the transparency of only a part of the objects 61 to 63 with respect to the determined region. This is the same as in the second embodiment.

Further, although personal computers 1 and 81 are respectively illustrated in the first and second embodiments, any of electronic devices displaying an image is also applicable to the present technology. That is, for example, the present technology is applicable to a television set for receiving and displaying an image through broadcasting electrical waves or a hard disk recorder for displaying a recorded moving image, and the like.

Here, the present technology may have a configuration as follows.

(1) A display control device includes: a changing unit changing a two-dimensional location representing locations in a horizontal direction and an orthogonal direction of each of a plurality of objects having different depths for a display screen of a display unit according to a direction in which a user views the display unit; a transparency adjusting unit for adjusting transparency for each of the plurality of objects; and a display control unit for displaying the plurality of objects in which the two-dimensional location is changed and the transparency is adjusted on the display unit, so as to overlap each other.

(2) The display control device according to the above-described (1), further includes: a detecting unit for detecting an object, to which the user focuses, of the plurality of objects, wherein the transparency adjusting unit adjusts transparency of the object to which the user attends to be lower than that of an object to which the user does not focus.

(3) The transparency adjusting unit according to the above-described (1) or (2), may adjust respective transparencies of the plurality of objects to have different values.

Incidentally, the series of processes described above may be executed by hardware or may be executed by software. In a case where the series of processes are executed by software, a program that configures the software is installed from a program recording medium onto a computer that has built-in dedicated hardware or a general-purpose computer that is able to execute various functions by installing various programs.

[Configuration Example of Computer]

Figure 11:
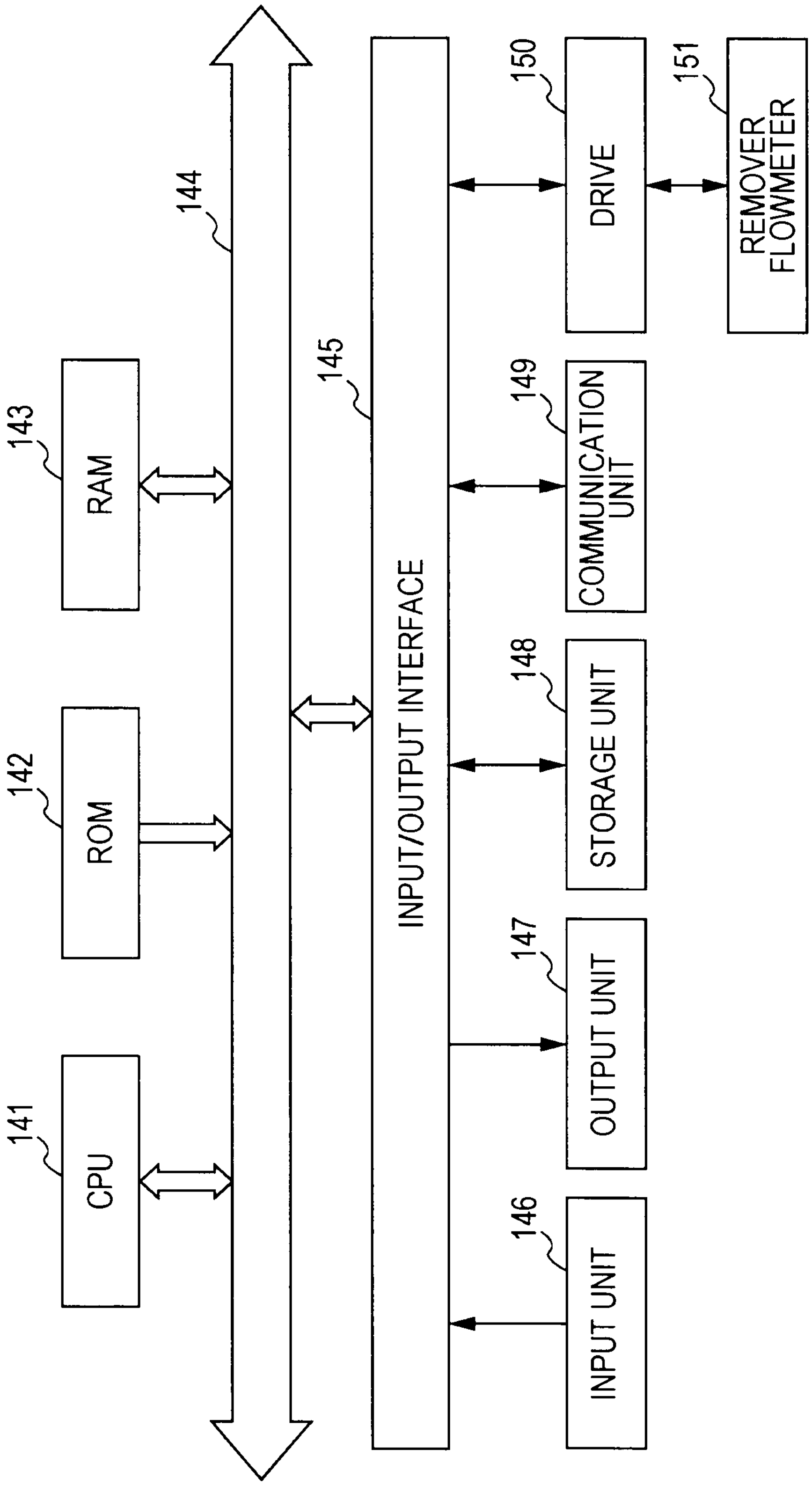
FIG. 11 is a block diagram for illustrating a configuration example of a computer.

FIG. 11 illustrates a configuration example of hardware of a computer for performing a series of foregoing processes by a program.

A Central Processing Unit (CPU) 141 performs various processes according to a program stored in a Read Only Memory (ROM) 142 or a storage unit 148. The program that the CPU 141 executes, data, and the like are stored as appropriate in a RAM (Random Access Memory) 143. The CPU 141, the ROM 142, and the RAM 143 are connected to each other by a bus 144.

Further, an input/output interface 145 is connected to the CPU 141 via the bus 144. An input unit 146 composed of a keyboard, a mouse, a microphone, and the like and an output unit 147 composed of a display, a speaker, and the like are connected to the input/output interface 145. The CPU 141 executes various processes according to instructions that are input from an input unit 146. Furthermore, the CPU 141 outputs the results of the processes to an output unit 147.

The storage unit 148 that is connected to the input/output interface 145 is composed, for example, of a hard disk, and stores the program that the CPU 141 executes and various pieces of data. A communication unit 149 communicates with an external device via a network such as the Internet or a local area network.

Further, a program may be obtained via the communication unit 149 and stored in the storage unit 148.

When a removable medium 151 such as a magnetic disk, an optical disc, a magneto-optical disc, or a semiconductor memory is fitted, a drive 150 that is connected to the input/output interface 145 drives the removable medium 151 and obtains a program, data, or the like that is recorded therein. The program or the data that is obtained is transferred to the storage unit 148 and stored as necessary.

As illustrated in FIG. 11, a recording medium that records (stores) a program that is installed on a computer and which is in an executable by the computer is configured by the removable medium 151 that is a packaged medium composed of a magnetic disk (includes flexible disks), an optical disc (includes CD-ROMs (Compact Disc-Read Only Memory) and DVDs (Digital Versatile Disc)), magneto optical discs (MD (Mini-disc)), a semiconductor memory, or the like, the ROM 142 in which a program is temporarily or indefinitely stored, a hard disk that configures the storage unit 148, or the like. The recording of a program on a recording medium is performed using a wired or wireless communication medium such as a local area network, the Internet, or a digital satellite broadcast via the communication unit 149 that is an interface such as a router, a modem, or the like as necessary.

Here, in the specification, the steps that describe the series of processes described above may not only be processed in a time series manner in the order described but also include processes that are executed in parallel or individually without necessarily being processed in a time series manner.

Here, the embodiments of the present disclosure are not limited to the first and second embodiments described above, and various modifications are possible within a scope of not departing from the gist of the embodiments of the present disclosure.

The present disclosure contains subject matter related to that disclosed in Japanese Priority Patent Application JP 2011-078823 filed in the Japan Patent Office on Mar. 31, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:

circuitry configured to change a two-dimensional location representing locations in a horizontal direction and an orthogonal direction of each of a plurality of objects having different depths for a display screen of a display according to a direction in which a user views the display;

adjust transparency for each of the plurality of objects; and control a display to display the plurality of objects in which the two-dimensional location is changed and the transparency is adjusted so as to overlap each other.

2. The display control device according to claim 1, wherein the circuitry is configured to:

detect an object, to which the user focuses, of the plurality of objects; and adjust transparency of the object to which the user attends to be lower than that of an object to which the user does not focus.

3. The display control device according to claim 2, wherein the circuitry is configured to adjust respective transparencies of the plurality of objects to have different values.

4. A display control method of a display control device for displaying an object on a display, the method by the display control device comprising:

changing a two-dimensional location representing locations in a horizontal direction and an orthogonal direction for each of a plurality of objects having different depths for a display screen of a display according to a direction in which a user views the display;

adjusting transparency for each of the plurality of objects; and controlling the display to display the plurality of objects in which the two-dimensional location is changed and the transparency is adjusted so as to overlap each other.

5. A non-transitory computer-readable medium including computer executable instructions, which when executed by an information processing device, cause the information processing device to:

change a two-dimensional location representing locations in a horizontal direction and an orthogonal direction for each of a plurality of objects having different depths for a display according to a direction in which a user views the display;

adjust transparency for each of the plurality of objects; and control the display to display the plurality of objects in which the two-dimensional location is changed and the transparency is adjusted so as to overlap each other.

* * * * *